US012804671B2

(12) United States Patent
Li

(10) Patent No.: US 12,804,671 B2
(45) Date of Patent: Nov. 17, 2026

(54) COMMUNICATION METHODS AND DEVICES FOR DECODING MODES FOR CANDIDATE PDCCH

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 389 days.

(21) Appl. No.: 18/255,994

(22) PCT Filed: Dec. 7, 2020

(86) PCT No.: PCT/CN2020/134347

§ 371 (c)(1),
(2) Date: Jun. 5, 2023

(87) PCT Pub. No.: WO2022/120537

PCT Pub. Date: Jun. 16, 2022

(65) Prior Publication Data

US 2024/0057105 A1 Feb. 15, 2024

(51) Int. Cl.
*H04W 72/231* (2023.01)
*H04B 7/0408* (2017.01)
(Continued)

(52) U.S. Cl.
CPC ........ *H04W 72/231* (2023.01); *H04B 7/0408* (2013.01); *H04W 72/0446* (2013.01); *H04W 72/0453* (2013.01)

(58) Field of Classification Search
CPC ........... H04W 72/231; H04W 72/0446; H04W 72/0453; H04W 72/046; H04W 72/232;
(Continued)

(56) References Cited

U.S. PATENT DOCUMENTS

2019/0191360 A1* 6/2019 Sun ........................ H04W 48/12
2019/0386771 A1* 12/2019 Liu ........................ H04B 7/0689
(Continued)

FOREIGN PATENT DOCUMENTS

WO WO 2020/143752 A1 7/2020

OTHER PUBLICATIONS

Merriam-Webster, single, 2026, [retrieved on Jul. 17, 2026]. Retrieved from the Internet <URL: https://www.merriam-webster.com/dictionary/single>. (Year: 2026).*
(Continued)

*Primary Examiner* — Omar J Ghowrwal
(74) *Attorney, Agent, or Firm* — Finnegan, Henderson, Farabow, Garrett & Dunner, L.L.P.

(57) ABSTRACT

A communication method is performed by a terminal and includes: determining a first decoding mode for downlink control information; wherein the downlink control information is received on one or more candidate physical downlink control channels in one or more beam directions, wherein the first decoding mode includes at least one of: performing individual decoding on the downlink control information received on the one or more candidate physical downlink control channels; or performing combined decoding on the downlink control information received on the one or more candidate physical downlink control channels.

17 Claims, 6 Drawing Sheets

(51) Int. Cl.

| | |
|---|---|
| ***H04B 7/06*** | (2006.01) |
| ***H04B 7/08*** | (2006.01) |
| ***H04L 1/00*** | (2006.01) |
| ***H04L 1/06*** | (2006.01) |
| ***H04L 5/00*** | (2006.01) |
| ***H04W 24/08*** | (2009.01) |
| ***H04W 72/044*** | (2023.01) |
| ***H04W 72/0446*** | (2023.01) |
| ***H04W 72/0453*** | (2023.01) |
| ***H04W 72/23*** | (2023.01) |
| ***H04W 72/232*** | (2023.01) |

(58) Field of Classification Search
CPC .... H04W 72/23; H04W 24/08; H04B 7/0408; H04B 7/0626; H04B 7/06964; H04B 7/0842; H04B 7/0871; H04B 7/06952; H04B 7/0697; H04L 1/0046; H04L 1/0072; H04L 1/06; H04L 5/0055; H04L 5/0057; H04L 5/0005; H04L 5/0023; H04L 5/0094; H04L 5/0053; H04L 1/0038; H04L 5/0051
See application file for complete search history.

(56) References Cited

U.S. PATENT DOCUMENTS

| | | | |
|---|---|---|---|
| 2020/0029310 | A1 | 1/2020 | Lee et al. |
| 2020/0229216 | A1 | 7/2020 | Zhu |

OTHER PUBLICATIONS

International Search Report and Written Opinion of International Application No. PCT/CN2020/134347, dated Aug. 2, 2021, 15 pages.
European Search Report, dated Jan. 22, 2024, issued in European Patent Application No. 20964484.8 (7 pages).
"Enhancements on multi-TRP/panel transmission", NTT Docomo, Inc., 3GPP TSG RAN WG1 #96bis, R1-1904966, Xi'an, China, Apr. 8-12, 2019, 29 pages.
Office Action issued by the Korean Patent Office on Jul. 11, 2025, in corresponding Application No. KR 10-2023-7022459, 11 pages.

* cited by examiner

COMMUNICATION METHODS AND DEVICES FOR DECODING MODES FOR CANDIDATE PDCCH

CROSS-REFERENCE TO RELATED APPLICATION

The present application is a national phase entry of International Application PCT/CN2020/134347, filed Dec. 7, 2020, the entire disclosures of which are incorporated herein by reference.

TECHNICAL FIELD

The present disclosure relates to a communication technical field, and more particularly to a communication method, a communication apparatus and a storage medium.

BACKGROUND

In a new radio (NR) technology, for example, when a communication frequency band is in frequency range 2, since a high-frequency channel attenuates quickly, in order to ensure coverage, it is necessary to use beam-based transmission and reception. When a network device (such as a base station) has a plurality of transmission reception points (TRPs), the plurality of TRPs may be used to provide services for a terminal, which includes using the plurality of TRPs to send a physical downlink control channel (PDCCH) for the terminal.

When the network device uses a plurality of (typically 2) TRPs to send the PDCCH for the terminal, different TRPs are sent using different beams. For the candidate PDCCH (PDCCH candidate) used by different TRPs to send downlink control information (DCI) signaling, the terminal may have many different decoding modes, but time domain resources or frequency domain resources corresponding to a plurality of PDCCH candidates may be same or different.

Various decoding modes of PDCCH are applied for different scenarios, and each of the various decoding modes has different advantages and disadvantages.

SUMMARY

The present disclosure provides a communication method, a communication apparatus and a storage medium.

According to a first aspect of the present disclosure, a communication method is provided, which is performed by a terminal and includes determining a first decoding mode for downlink control information. The downlink control information is downlink control information received on one or more candidate physical downlink control channels in one or more beam directions, and the first decoding mode is one or more of a plurality of different second decoding modes.

According to a second aspect of the present disclosure, a communication method is provided, which performed by a network device and includes determining a first sending mode for downlink control information. The downlink control information is downlink control information sent on one or more candidate physical downlink control channels in one or more beam directions, and the first sending mode is sending the downlink control information on one or more physical downlink control channels, the first sending mode corresponds to a first decoding mode of a terminal.

According to a third aspect of the present disclosure, a communication device is provided, and the communication device includes a processor; and a memory for storing instructions executable by the processor. The processor is configured to implement the communication method according to any one of the first aspect of the present disclosure.

It is to be understood that both the above general description and the following detailed description are illustrative and explanatory only and are not limitation of the present disclosure.

BRIEF DESCRIPTION OF THE DRAWINGS

The accompanying drawings, which are incorporated in and constitute a part of the specification, illustrate embodiments consistent with the disclosure and together with the description serve to explain the present disclosure.

DETAILED DESCRIPTION

Figure 1:
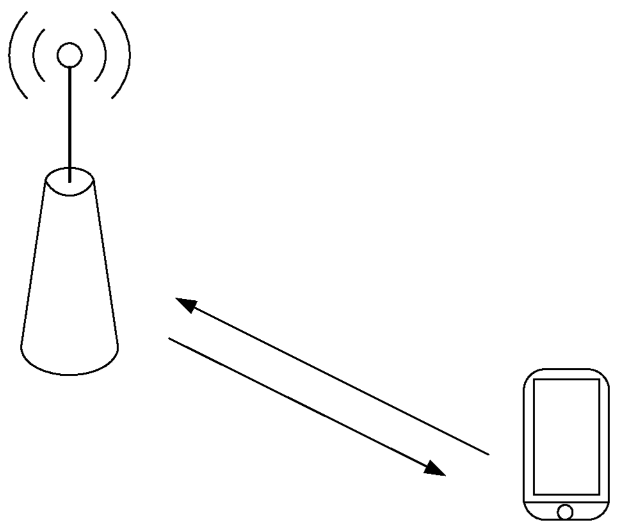
FIG. 1 is a schematic diagram illustrating a wireless communication system according to an embodiment of the present disclosure.

Embodiments of the present disclosure are described in detail below, examples of which are illustrated in the drawings. When the following the accompanying drawings are described, the same or similar elements are denoted by same reference numerals in different drawings unless indicated otherwise. Implementations described in the following embodiments do not represent all implementations that are consistent with embodiments of the present disclosure. On the contrary, they are only examples of devices and methods that are consistent with some aspects of the embodiments of the present disclosure as detailed in the attached claims.

A data transmission method provided by embodiments of the present disclosure may be applied to a wireless communication system shown in FIG. 1. Referring to FIG. 1, the wireless communication system includes a terminal and a network device. The terminal is connected to the network device through wireless resources, and sends and receives data.

It is understood that the wireless communication system shown in FIG. 1 is only for schematic illustration, and the wireless communication system may also include other network devices, such as core network devices, wireless relay devices, and wireless backhaul devices, etc. which are shown in FIG. 1. Embodiments of the present disclosure does not limit the number of network devices and the number of terminals included in the wireless communication system.

It is further understood that the wireless communication system in embodiments of the present disclosure is a network that provides a wireless communication function. The wireless communication systems may use different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency-division multiple access (single carrier FDMA, SC-FDMA), carrier sense multiple access with conflict avoidance. According to the capacity, speed, delay and other factors of different networks, the network may be divided into 2G (generation) network, 3G network, 4G network or future evolution network, such as 5G network, and 5G network may also be called a new radio (NR) network. For convenience of description, the present disclosure sometimes simply refers to a wireless communication network as a network.

Furthermore, the network device involved in the present disclosure may also be referred to as a radio access network device. The radio access network device may be a base station, an evolved node base station (evolved node B, eNB), a home base station, an access point (access point, AP) in a wireless fidelity (WIFI) system, a wireless relay node, a wireless backhaul node, a transmission point (tTP) or a transmission and reception point (TRP), etc., and also be a gNB in an NR system, or be a component or a part of devices that constitutes a base station and so on. When it is a vehicle-to-everything (V2X) communication system, the network device may also be a vehicle-mounted device. It is understood that in e embodiments of the present disclosure, a specific technology and a specific form adopted by the network device are not limited.

Furthermore, the terminals involved in the present disclosure may also be referred to as a terminal device, user equipment (UE), a mobile station (MS), a mobile terminal (MT), etc., which is a device providing voice and/or data connectivity. For example, the terminal may be a handheld device with a wireless connection function, a vehicle-mounted device, and the like. At present, examples of some terminals are: a smart mobile phone, a pocket computer (PPC), a palmtop computer, a personal digital assistant (PDA), a notebook computer, a tablet computer, a wearable device, or vehicle equipment, etc. In addition, when it is a vehicle-to-everything (V2X) communication system, the terminal device may also be a vehicle-mounted device. It is understood that embodiments of the present disclosure does not limit the specific technology and specific form adopted by the terminal.

In the present disclosure, data transmission is performed between a network device and a terminal based on a beam. During beam-based data transmission, when the network device (such as a base station) uses a plurality of TRPs (are also called multi-TRPs) to transmit a physical downlink control channel (PDCCH) to the terminal, different TRPs use different beams for transmission. It is understood that a plurality of PDCCH candidates use different beams, but time domain or frequency domain resources corresponding to the plurality of PDCCH candidates may be the same or different.

A typical value of the multi-TRP is 2, and in the following embodiments, a number of PDCCH candidates sent by the terminal as the multi-TRP is 2 for illustration.

For PDCCH candidates used by different TRPs to send a downlink control information (DCI) signaling, the terminal may have a plurality of receiving manners, for example, which may include the following manners.

Manner 1: directly performing combined decoding on PDCCH candidates without individual decoding.

Manner 2: only performing individual decoding on two PDCCH candidates without combined decoding.

Manner 3: only performing individual decoding on one of the PDCCH candidates, and performing combined decoding.

Manner 4: performing individual decoding and combined decoding on two PDCCH candidates.

Various receiving and decoding modes for the terminal have their own advantages and disadvantages, and the applicable scenarios are different, so how the terminal determines the applicable decoding mode is a problem that needs to be solved.

An embodiment of the present disclosure provides a communication method. A terminal determines a decoding mode used by the PDCCH according to various decoding modes of the PDCCH. A DCI signaling is carried on the PDCCH. The implementation manner of determining the decoding mode may be, for example, a dynamic instruction from the base station, or may be determined by the terminal according to standard regulations, so as to realize the use of different decoding modes in different scenarios.

In embodiments of the present disclosure, a decoding mode used by the PDCCH is referred to a first decoding mode, and a plurality of different decoding modes used to determine the first decoding mode are referred to as second decoding modes. The first decoding mode is one or more of the plurality of the different second decoding modes.

Figure 2:
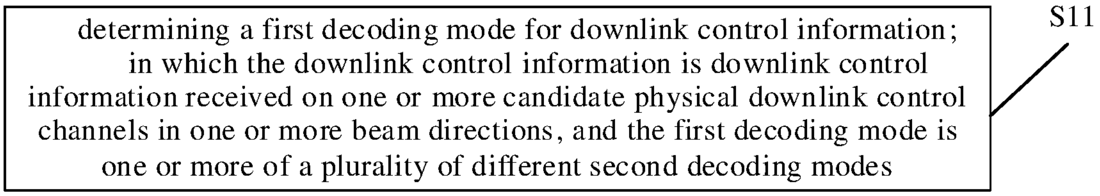
FIG. 2 is a flowchart illustrating a communication method according to an embodiment of the present disclosure.

FIG. 2 is a flowchart showing a communication method according to an embodiment. As shown in FIG. 2, the communication method is performed by a terminal and includes the following steps.

In step S11, a first decoding mode of DCI is determined.

The DCI involved in embodiments of the present disclosure may be understood as DCI received on one or more PDCCH candidates in one or more beam directions.

Furthermore, the first decoding mode may be determined based on the plurality of the different second decoding modes. For example, the first decoding mode is one or more of the plurality of the different second decoding modes.

In the communication method provided by embodiments of the present disclosure, the first decoding mode may include at least one of the following: performing individual decoding on the DCI received on the one or more PDCCH candidates, and/or performing combined decoding on the DCI received on the one or more PDCCH candidates. Alternatively, it is understood that the first decoding mode includes at least one of the following: performing individual decoding on one or more of the DCI received in a plurality of beam directions; and/or performing combined decoding on the DCI received in a plurality of beam directions.

The terminal determines the first decoding mode of the downlink control information when the downlink control information is received on one or more candidate physical downlink control channels in one or more beam directions, which may improve the success rate of receiving and decoding the downlink control information.

Figure 3:
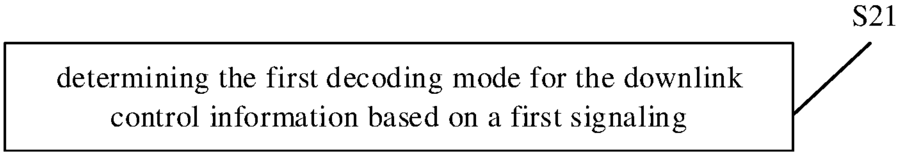
FIG. 3 is a flowchart illustrating a communication method according to an embodiment of the present disclosure.

FIG. 3 is a flowchart showing a communication method according to an embodiment. As shown in FIG. 3, the communication method is performed by a terminal and includes the following steps.

In step S21, a first decoding mode of DCI is determined based on a first signaling.

In embodiments of the present disclosure, the first signaling may be an indication signaling sent by the network device. The terminal determines the first decoding mode of the DCI based on the indication signaling sent by the network device.

Furthermore, in the communication method provided in embodiments of the present disclosure, the first signaling is used to indicate one or more of the plurality of the different second decoding modes.

In the communication method provided in embodiments of the present disclosure, it is assumed that one or more PDCCH candidates include a first number of PDCCH candidate combinations. The number of the PDCCH candidates in each PDCCH candidate combination is greater than or equal to 1, and less than or equal to a total number of the one or more PDCCH candidates. Different PDCCH candidates in each PDCCH candidate combination correspond to different beams, and different beams correspond to different TRPs. That is, the total number of the PDCCH candidates in each PDCCH candidate combination corresponds to a total number of beams, that is, corresponds to a total number of TRPs to send the PDCCH for the terminal. A value of the total number is greater than or equal to 1, and is typically 2. The second decoding mode includes: performing combined decoding on the DCI signaling received on the PDCCH candidates in each PDCCH candidate combination of the first number of the PDCCH candidate combinations.

In embodiments of the present disclosure, in case that each PDCCH candidate combination in the first number of PDCCH candidate combinations includes one PDCCH candidate, the first number of PDCCH candidate combinations is the first number of PDCCH candidates. Performing combined decoding on the DCI signaling received on PDCCH candidates in each PDCCH candidate combination in the first number of PDCCH candidate combinations may be understood as performing individual decoding on the first number of PDCCH candidates.

In embodiments of the present disclosure, in case that the total number of PDCCH candidates is the first number, and the number of PDCCH candidate combinations is 1, when the first number is greater than 1, such as 2, and the PDCCH candidate combination includes the first number of PDCCH candidates, it may be understood that the combined decoding is performed on the first number of PDCCH candidates.

In embodiments of the present disclosure, in case that the number of PDCCH candidates in each PDCCH candidate combination is greater than or equal to 1 and less than the total number of one or more PDCCH candidates, it may be understood that a number of PDCCH candidates included in some PDCCH candidate combinations is 1, that is, individual decoding is performed on some PDCCH candidates The number of PDCCH candidates included in some PDCCH candidate combinations is greater than 1, that is, combined decoding is performed on some PDCCH candidates.

For the convenience of description, in an embodiment, it is assumed that there are N TRPs sent using N beam directions, and there are N PDCCH candidates. N PDCCH candidates are first divided into M combinations, where M is less than or equal to N. Each combination contains one or more PDCCH candidates, and the decoding modes of the PDCCH candidates may include the following modes:

a) mode 1: directly performing combined decoding on N PDCCH candidates without performing individual decoding;
b) mode 2: only performing individual decoding on N PDCCH candidates without performing combined decoding;
c) mode 3: performing individual decoding on only one or more PDCCH candidates, and performing combined decoding on N PDCCH candidates;
d) mode 4: performing individual decoding on N PDCCH candidates and combined decoding on N PDCCH candidates.
e) mode 5: performing combined decoding on M PDCCH candidate combinations inside the combinations, and performing combined decoding on N PDCCH candidates;
f) mode 6: performing combined decoding on M PDCCH candidate combinations inside the combinations.

It is understood that, since some of the M PDCCH candidate combinations may include one PDCCH candidate, and some may include a plurality of PDCCH candidates, the decoding modes may be allocated flexibly.

In the communication method provided in embodiments of the present disclosure, there are a plurality of second decoding modes, and each decoding mode may be identified. When determining the first decoding mode, it may be determined based on the identifier of the decoding mode. For example, a serial number is allocated for each decoding mode, and when determining the first decoding mode, it may be directly determined based on the serial number. When the first decoding mode is determined based on the identifier, it may be determined based on the first signaling.

The first signaling may be one or a combination of more of a radio resource control (RRC) signaling, a medium access control (MAC) control element (CE) signaling and a downlink control information (DCI) signaling.

For example, in the communication method provided in embodiments of the present disclosure, the first signaling includes the MAC CE signaling, and the MAC CE signaling indicates a serial number of the first decoding mode, so that the first decoding mode may be determined. A corresponding relationship between the serial number and the decoding mode may be indicated by the RRC signaling, or specified by a standard protocol and written into a terminal chip.

In the communication method provided in embodiments of the present disclosure, the first signaling may include the DCI signaling, and the first decoding mode may be determined by the serial number of the first decoding mode indicated through the DCI signaling. A corresponding relationship between the serial number and the decoding mode may be indicated by the RRC signaling, or specified by a standard protocol and written into the terminal chip.

Furthermore, in the communication method provided in embodiments of the present disclosure, the first signaling may include the MAC CE signaling and the RRC signaling, or the DCI signaling and the RRC signaling. The MAC CE signaling or the DCI signaling indicates the serial number of the first decoding mode, and the RRC signaling indicates the corresponding relationship between the first decoding mode and the second decoding mode, and the serial number corresponding to each decoding mode in the plurality of the different second decoding modes.

In the communication method provided in embodiments of the present disclosure, the first signaling may include the DCI signaling and the MAC CE signaling. The MAC CE signaling indicates a plurality of decoding modes (the first decoding mode or the second decoding mode), and the DCI signaling indicates one or more of the plurality of the decoding modes indicated by the MAC CE signaling, which is used for a decoding mode (the first decoding mode) of a DCI signaling after the DCI signaling.

In the communication method provided in embodiments of the present disclosure, the first signaling is configured to indicate a first time-frequency resource of a PDCCH candidate or a second time-frequency resource of a PDCCH candidate. The first time-frequency resource of the PDCCH candidate is a time-frequency resource of the PDCCH candidate for a PDCCH transmission mode based on a plurality of TRPs, and the second time-frequency resource of the PDCCH candidate is a time-frequency resource of the PDCCH candidate for a PDCCH transmission mode based on a single TRP. The first time-frequency resource of the PDCCH candidate and the second time-frequency resource of the PDCCH candidate correspond to different decoding modes.

In one embodiment, the first time-frequency resource of the PDCCH candidate corresponds to a combined decoding mode, and the second time-frequency resource of the PDCCH candidate corresponds to an individual decoding mode.

In the communication method provided in embodiments of the present disclosure, the first signaling is configured to indicate the first time-frequency resource of the PDCCH candidate or the second time-frequency resource of the PDCCH candidate, so as to indicate, by the first indication signaling, which time-frequency resource of the PDCCH candidate is used for the resources send by the plurality of the TRPs, and which time-frequency resource of the PDCCH candidate is used for the resources sent by a single TRP. The terminal adopts the individual decoding mode for the time-frequency resource of the PDCCH candidate sent by a single TRP, and adopts the combined decoding mode for the time-frequency resources of the PDCCH candidates sent by the plurality of the TRPs.

Figure 4:
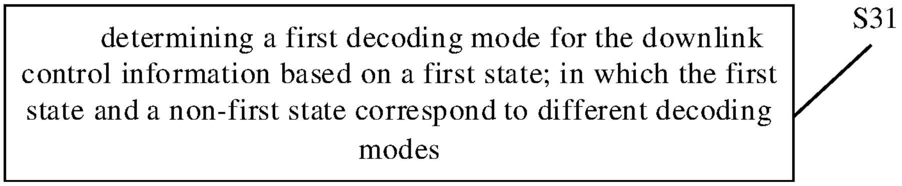
FIG. 4 is a flowchart illustrating a communication method according to an embodiment of the present disclosure.

FIG. 4 is a flowchart showing a communication method according to an embodiment. As shown in FIG. 4, the communication method is perform by a terminal and includes the following steps.

In step S31, based on a first state, a first decoding mode of DCI is determined. The first state and a non-first state correspond to different decoding modes.

In embodiments of the present disclosure, the first state includes one or a combination of the following.

A) A PDCCH candidate with a lower channel state information (CSI) feedback value is present according to CSI feedbacks on a plurality of PDCCH candidates.

The lower CSI feedback value may be understood as that a CSI feedback value on a certain PDCCH candidate is lower than CSI feedback values on other PDCCH candidates. For example, a difference between a CSI feedback value on a certain PDCCH candidate and CSI feedback values on other one or more PDCCH candidates is greater than a threshold. Alternatively, a CSI feedback value on a certain PDCCH candidate itself is low, for example, a CSI feedback value on a certain PDCCH candidate may be lower than a set feedback threshold of a CSI feedback value.

B) A demodulation reference signal (DMRS) with poor reception performance is present in DMRSs on a plurality of PDCCH candidates.

The poor reception performance of the DMRS may be understood as that the reception performance of the DMRS on a certain PDCCH candidate is relatively poor compared to the reception performance of the DMRS on other PDCCH candidates. For example, a difference between the reception performance of the DMRS on a certain PDCCH candidate and the reception performance of the DMRS on other one or more PDCCH candidates is greater than a threshold. Alternatively, the reception performance of the DMRS on the certain PDCCH candidate is poor, for example, the reception performance of the DMRS on a certain PDCCH candidate is lower than a set reception performance threshold of the DMRS C) A transmission control indication (TCI) state of a plurality of PDCCH candidates is indicated by independent signalings, and a PDCCH candidate with the TCI state unsuccessfully indicated is present.

The number of the PDCCH candidate with the TCI state successfully indicated may be one or more. The TCI state of the PDCCH candidate may be a TCI state of a control resource set associated with a search space set corresponding to the PDCCH candidate.

D) A PDCCH candidate corresponding to a TRP where beam failure occurs is present in a plurality of PDCCH candidates.

The number of the TRPs without beam failure may be one or more.

In the communication method provided in embodiments of the present disclosure, the first state and the non-first state correspond to different decoding modes.

In one embodiment, the first state corresponds to the individual decoding mode, and the non-first state corresponds to the combined decoding mode.

The first state corresponds to the individual decoding mode, and/or the second state corresponds to the combined decoding mode, based on a protocol.

In the communication method provided in embodiments of the present disclosure, in case of presence of the PDCCH candidate with the lower CSI feedback value according to CSI feedbacks on the plurality of the PDCCH candidates, the terminal may receive a DCI signaling on one or more PDCCH candidates corresponding to the CSI feedback value with the largest CSI feedback value of the plurality of the PDCCH candidates. The DCI signaling received on one or more PDCCH candidates corresponding to the CSI feedback value with the largest CSI feedback value in the CSI feedback values of the plurality of the PDCCH candidates is decoded in the individual decoding mode.

In the communication method provided in embodiments of the present disclosure, the DMRS with poor reception performance is present in the DMRSs on the plurality of the PDCCH candidates, and the terminal may receive a DCI signaling on one or more PDCCH candidates corresponding to the DMRS with the best reception performance in the DMRSs of the plurality of the PDCCH candidates. The received DCI signaling on one or more PDCCH candidates corresponding to the DMRS with the best reception performance in the DMRSs of the plurality of the PDCCH candidates is decoded in the individual decoding mode.

In the communication method provided in embodiments of the present disclosure, an independent signaling is used to indicate the TCI states of the plurality of the PDCCH candidates, and one PDCCH candidate with the TCI state unsuccessfully indicated is present, and the terminal may receive the DCI signaling on the PDCCH candidate with the TCI state successfully indicated. The DCI signaling on one or more PDCCH candidates with the TCI state successfully indicated is decoded in the individual decoding mode.

In the communication method provided in embodiments of the present disclosure, in case that the PDCCH candidate corresponding to the TRP with beam failure is present in a plurality of PDCCH candidates, the terminal may receive a DCI signaling on the PDCCH candidate corresponding to the TRP without beam failure in the TRPs. The received DCI signaling on one or more PDCCH candidates corresponding to the TRP without beam failure in the TRPs is decoded in the individual decoding mode.

In an example, various conditions are configured through a protocol, and the terminal uses different decoding modes under different conditions. The configured conditions may be written into a terminal chip. For example, based on the configured condition, the terminal may determine the decoding mode and perform the corresponding communication mode as follows. Take two TRPs respectively using different PDCCH candidates to send the DCI signaling on the PDCCH for the terminal as an example.

a) When a PDCCH candidate with a lower CSI feedback value on PDCCH candidates corresponding to two TRPs is present (for example, a difference between a CSI feedback value on a certain PDCCH candidate and a CSI feedback value on another PDCCH candidate is greater than a threshold; or a CSI feedback value on a certain PDCCH candidate itself is poor, for example, a CSI feedback value on a certain PDCCH candidate is lower than a set feedback threshold of a CSI feedback value), a DCI signaling sent on a PDCCH candidate with a larger CSI feedback value is received, and the DCI signaling received on the PDCCH candidate with the larger CSI feedback value is decoded in the individual decoding mode. When a PDCCH candidate with a lower CSI feedback value on the PDCCH candidates corresponding to the two TRPs is not present, the DCI signaling on the PDCCH candidates corresponding to the two TRPs are received, and the DCI signaling received on the two PDCCH candidates is decoded in the combined decoding mode.

b) According to DMRS of a PDCCH candidate, when a reception performance of DMRS on one PDCCH candidate in the two PDCCH candidates is poor (such as, less than another set threshold; or a different between the reception performance of the DMRS on one certain PDCCH candidate and the reception performance of the DMRS on another PDCCH candidate is greater than a threshold), a DCI signaling on the PDCCH candidate with better reception performance of the DMRS is received, and the received DCI signaling on the PDCCH candidate is decoded in the individual decoding mode. When the reception performance of the DMRS of the PDCCH in the two PDCCH candidates is good, a DCI signaling is received on the two PDCCH candidates, and the DCI signaling received on the two PDCCH candidates is decoded in the combined decoding mode.

c) When the TCI states corresponding to two PDCCH candidates are indicated by independent signaling, if a PDCCH candidate with a TCI state unsuccessfully indicated is present, a DCI signaling on a PDCCH candidate with a TCI state successfully indicated is received, and the DCI signaling received on PDCCH candidate with a TCI state successfully indicated is decoded in the individual decoding mode. If a PDCCH candidate with a TCI state unsuccessfully indicated is not present, a DCI signaling on the two PDCCH candidates with the TCI state successfully indicated is received, and the DCI signaling on the two PDCCH candidates with the TCI state successfully indicated is decoded in the combined decoding mode.

d) In case that a PDCCH candidate corresponding to a TRP where beam failure occurs in two PDCCH candidates is present, the terminal may receive a DCI signaling on a PDCCH candidate corresponding to a TRP without beam failure in TRPs. The received DCI signaling on the PDCCH candidate corresponding to the TRP without beam failure in the TRPs is decoded in the individual decoding mode. In case that a PDCCH candidate corresponding to a TRP where beam failure occurs is not present in the two PDCCH candidates, the terminal may receive a DCI signaling on the two PDCCH candidates corresponding to the TRP without beam failure in the TRPs. The received DCI signaling on the two PDCCH candidates corresponding to the TRP without beam failure in the TRPs is decoded in the combined decoding mode.

In the communication method provided in embodiments of the present disclosure, in case that the network device uses multi-TRP to send the PDCCH, the terminal determines the decoding mode according to the condition stipulated in the first signaling or the protocol, so as to improve a success rate of receiving and decoding the PDCCH.

Based on a same concept, embodiments of the present disclosure also provides a communication method performed by a network device.

Figure 5:
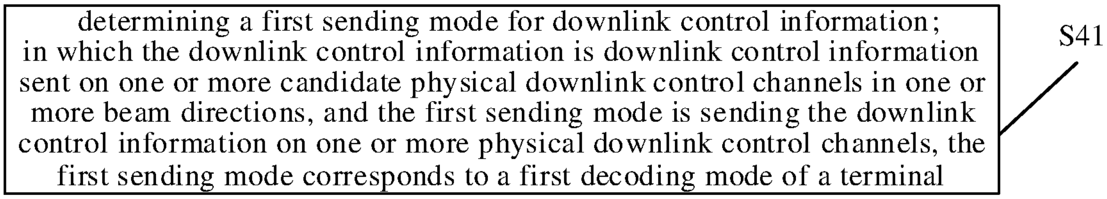
FIG. 5 is a flowchart illustrating a communication method according to an embodiment of the present disclosure.

FIG. 5 is a flowchart showing a communication method according to an embodiment. As shown in FIG. 5, the communication method is performed by a network device and includes the following steps.

In step S41, a first sending mode of DCI is determined.

The DCI is DCI sent on one or more PDCCH candidates in one or more beam directions.

The first sending mode is to send the DCI on one or more PDCCH candidates. The first sending mode corresponds to the first decoding mode of the terminal.

In one embodiment, the first decoding mode includes performing individual decoding on the DCI sent on the one or more PDCCH candidates, and/or performing combined decoding on the DCI sent on the one or more PDCCH candidates.

In a communication method provided in embodiments of the present disclosure, the first sending mode corresponding to the first decoding mode may be realized through one embodiment of the first decoding mode indication information sent by the network device to the terminal.

Figure 6:
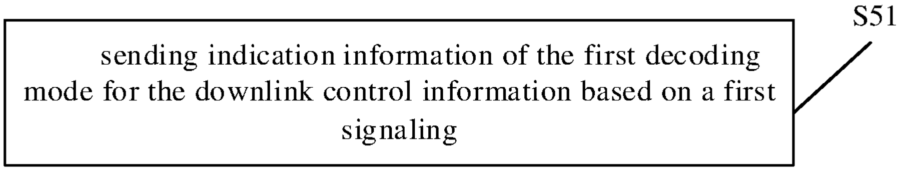
FIG. 6 is a flowchart illustrating a communication method according to an embodiment of the present disclosure.

FIG. 6 is a flowchart showing a communication method according to an embodiment. As shown in FIG. 6, the communication method is performed by a network device and includes the following steps.

In step S51, based on a first signaling, the first decoding mode indication information of DCI is sent.

It is understood that, in embodiments of the present disclosure, the first signaling sent by the network device may correspond to the first signaling received by the terminal.

In one embodiment, the first signaling is configured to indicate one or more of a plurality of different second decoding modes.

In one embodiment, one or more PDCCH candidates include a first number of PDCCH candidate combinations. The number of PDCCH candidates in each PDCCH candidate combination is greater than or equal to 1, and less than or equal to a total number of the one or more PDCCH candidates. Different PDCCH candidates in each PDCCH candidate combination correspond to different beams, and different beams correspond to different TRPs. That is, the total number of PDCCH candidates in each PDCCH candidate combination corresponds to a total number of beams, that is, corresponds to a total number of TRPs to send the PDCCH for the terminal. A value of the total number is greater than or equal to 1, and is typically 2. The second decoding mode includes: performing combined decoding on the DCI signaling sent on the PDCCH candidates in each PDCCH candidate combination of the first number of PDCCH candidate combinations.

In embodiments of the present disclosure, in case that each PDCCH candidate combination in the first number of PDCCH candidate combinations includes one PDCCH candidate, the first number of PDCCH candidate combinations is the first number of PDCCH candidates. Performing combined decoding on the DCI signaling received on PDCCH candidates in each PDCCH candidate combination in the first number of PDCCH candidate combinations may be understood as performing individual decoding on the first number of PDCCH candidates.

In embodiments of the present disclosure, in case that the total number of PDCCH candidates is the first number, and the number of PDCCH candidate combinations is 1, when the first number is greater than 1, such as 2, and the PDCCH candidate combination includes the first number of PDCCH candidates, it may be understood that the combined decoding is performed on the first number of PDCCH candidates.

In embodiments of the present disclosure, in case that the number of PDCCH candidates in each PDCCH candidate combination is greater than or equal to 1 and less than the total number of one or more PDCCH candidates, it may be understood that a number of PDCCH candidates included in some PDCCH candidate combinations is 1, that is, individual decoding is performed on some PDCCH candidates. The number of PDCCH candidates included in some PDCCH candidate combinations is greater than 1, that is, combined decoding is performed on some PDCCH candidates.

In one embodiment, the first signaling includes one or a combination of a RRC signaling, a MAC CE signaling, and a DCI signaling.

In the communication method provided in embodiments of the present disclosure, the first signaling may include a DCI signaling, and a serial number of the first decoding mode is indicated through the DCI signaling, so as to determine the first decoding mode. A corresponding relationship between the serial number and the decoding mode may be indicated by a RRC signaling, or specified by a standard protocol and written into the terminal chip.

Furthermore, in the communication method provided in embodiments of the present disclosure, the first signaling may include a MAC CE signaling and a RRC signaling, or a DCI signaling and a RRC signaling. The MAC CE signaling or the DCI signaling indicates a serial number of the first decoding mode, and the RRC signaling indicates a corresponding relationship between the first decoding mode and the second decoding mode, and a serial number corresponding to each decoding mode in the plurality of the different second decoding modes.

In the communication method provided in embodiments of the present disclosure, the first signaling may include a DCI signaling and a MAC CE signaling. The MAC CE signaling indicates a plurality of decoding modes (the first decoding mode or the second decoding mode), and the DCI signaling indicates one or more of the plurality of the decoding modes indicated by the MAC CE signaling, which is used for a decoding mode (the first decoding mode) of a DCI signaling after the DCI signaling.

In one embodiment, the first signaling is configured to indicate a first time-frequency resource of a PDCCH candidate or a second time-frequency resource of a PDCCH candidate.

The first time-frequency resource of the PDCCH candidate is a time-frequency resource of the PDCCH candidate for a PDCCH transmission mode based on a plurality of TRPs, and the second time-frequency resource of the PDCCH candidate is a time-frequency resource of the PDCCH candidate for a PDCCH transmission mode based on a single TRP. The first time-frequency resource of the PDCCH candidate and the second time-frequency resource of the PDCCH candidate correspond to different decoding modes.

In one embodiment, the first time-frequency resource of the PDCCH candidate corresponds to a combined decoding mode, and the second time-frequency resource of the PDCCH candidate corresponds to an individual decoding mode.

In one embodiment, the first decoding mode is determined based on a first state. The first state and a non-first state correspond to different decoding modes.

In one embodiment, the first state corresponds to an individual decoding mode, and the non-first state corresponds to a combined decoding mode.

In one embodiment, the first state corresponds to an individual decoding mode, and/or the second state corresponds to a combined decoding mode, which is determined based on a protocol.

In one embodiment, the first state includes one or a combination of the following.

A PDCCH candidate with a lower CSI feedback value is present in CSI feedbacks on a plurality of candidate physical downlink control channels. A DMRS with poor reception performance is present in DMRSs on a plurality of PDCCH candidates. A TCI state of a plurality of PDCCH candidates is indicated by independent signalings, and a PDCCH candidate with the TCI state unsuccessfully indicated is present. A PDCCH candidate corresponding to a TRP where beam failure occurs in a plurality of PDCCH candidates is present.

The number of the PDCCH candidate with the TCI state successfully indicated may be one or more.

The number of the TRPs without beam failure may be one or more.

In the communication method provided in embodiments of the present disclosure, in response to the first state of the terminal including presence of the PDCCH candidate with the lower CSI feedback value in the CSI feedbacks on the plurality of the PDCCH candidates, the terminal may receive a DCI signaling on one or more PDCCH candidates corresponding to the DMRS with the best reception performance in the DMRSs of the plurality of the PDCCH candidates.

In the communication method provided in embodiments of the present disclosure, in response to the first state of the terminal including presence of the DMRS with the poor reception performance in the DMRSs on the plurality of the PDCCH candidates, the network device sends a DCI signaling on the PDCCH candidate corresponding to the DMRS with the best reception performance in the DMRSs of the plurality of the PDCCH candidates.

In the communication method provided in embodiments of the present disclosure, in response to the first status of the terminal including a TCI state of a plurality of PDCCH candidates being indicated by independent signalings, and presence of the PDCCH candidate with the TCI state unsuccessfully indicated, the network device sends a DCI signaling on one or more PDCCH candidates with the TCI state successfully indicated.

In the communication method provided in embodiments of the present disclosure, in response to the first state of the terminal including presence of the PDCCH candidate corresponding to the TRP where beam failure occurs in the plurality of the PDCCH candidates, the network device sends a DCI signaling on one or more PDCCH candidates corresponding to the TRPs without beam failure.

In the communication method provided in embodiments of the present disclosure, the network device determines the first sending mode of the DCI, and the first sending mode corresponds to the first decoding mode of the terminal, so that a decoding mode of the terminal may be consistent with that between the network device and the terminal.

Based on a same concept, embodiments of the present disclosure also provides a communication apparatus.

It is understood that, in order to realize the above-mentioned functions, the communication apparatus provided in embodiments of the present disclosure includes corresponding hardware structures and/or software modules for performing various functions. Combining units and algorithm steps of each example disclosed in embodiments of the present disclosure, embodiments of the present disclosure may be implemented in a form of hardware or a combination of hardware and computer software. Whether a certain function is executed by hardware or computer software drives hardware depends on the specific applications and design constraints of the technical solution. Those skilled in the art may use different methods to implement the described functions for each specific application, but such implementation should not be regarded as exceeding the scope of the technical solutions of embodiments of the present disclosure.

Figure 7:
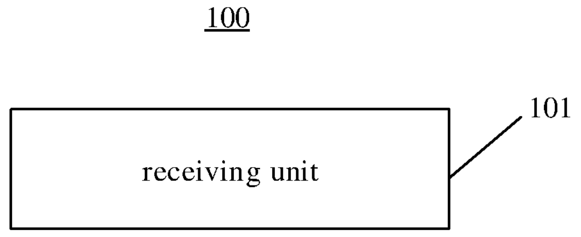
FIG. 7 is a block diagram illustrating a communication apparatus according to an embodiment of the present disclosure.

FIG. 7 is a block diagram of a communication apparatus according to an embodiment. Referring to FIG. 7, a communication apparatus 100 is performed to a terminal and includes a receiving unit 101.

The receiving unit 101 is configured to determine a first decoding mode of DCI.

The DCI is DCI received on one or more PDCCH candidates in one or more beam directions, and the first decoding mode is one or more of a plurality of different second decoding modes.

In one embodiment, the first decoding mode includes at least one of the following: performing independent decoding on the DCI received on one or more PDCCH candidates; and/or performing combined decoding on the DCI received on the one or more PDCCH candidates.

In one embodiment, the receiving unit 101 determines the first decoding mode of the DCI based on a first signaling.

In one embodiment, the first signaling is configured to indicate one or more of the plurality of different second decoding modes.

In one embodiment, the one or more PDCCH candidates include a first number of PDCCH candidate combinations. The number of PDCCH candidates in each PDCCH candidate combination is greater than or equal to 1, and less than or equal to a total number of one or more PDCCH candidates.

The second decoding modes include: performing combined decoding on the DCI received on the PDCCH candidates in each PDCCH candidate combination in the first number of PDCCH candidate combinations.

In one embodiment, the first signaling includes one or a combination of more of a RRC signaling, a MAC CE signaling, and a DCI signaling.

In one embodiment, the first signaling is configured to indicate a first time-frequency resource of a PDCCH candidate or a second time-frequency resource of a PDCCH candidate.

The first time-frequency resource of the PDCCH candidate is a time-frequency resource of a PDCCH candidate for a PDCCH transmission mode based on a plurality of TRPs, and the second time-frequency resource of the PDCCH candidate is a time-frequency resource of a PDCCH candidate for a PDCCH transmission mode based on a single TRP. The first time-frequency resource of the PDCCH candidate and the second time-frequency resource of the PDCCH candidate correspond to different decoding modes.

In one embodiment, the first time-frequency resource of the PDCCH candidate corresponds to a combined decoding mode, and the second time-frequency resource of the PDCCH candidate corresponds to an individual decoding mode.

In one embodiment, the receiving unit 101 determines a first decoding mode for the DCI based on a first state. The first state and a non-first state correspond to different decoding modes.

In one embodiment, the first state corresponds to an individual decoding mode, and the non-first state corresponds to a combined decoding mode.

In one embodiment, the first state corresponds to an individual decoding mode, and/or the second state corresponds to a combined decoding mode, which is determined based on a protocol.

In one embodiment, the first state includes one or a combination of the following.

A PDCCH candidate with a lower CSI feedback value is present in CSI feedbacks on a plurality of candidate physical downlink control channels. A DMRS with poor reception performance is present in DMRSs on a plurality of PDCCH candidates. A TCI state of a plurality of PDCCH candidates is indicated by independent signalings, and a PDCCH candidate with the TCI state unsuccessfully indicated is present. A PDCCH candidate corresponding to a TRP where beam failure occurs in a plurality of PDCCH candidates is present.

In one embodiment, the first state includes presence of a PDCCH candidate with a lower CSI feedback value according to CSI feedbacks on a plurality of PDCCH candidate. The receiving unit 101 is further configured to receive a DCI signaling on one or more PDCCH candidates corresponding to a CSI feedback value with a largest CSI feedback value in the plurality of the PDCCH candidates.

In one embodiment, the first state includes presence of DMRS with poor reception performance in DMRSs on a plurality of PDCCH candidates. The receiving unit 101 is further configured to receive a DCI signaling on a PDCCH candidate corresponding to a DMRS with a best reception performance in the DMRSs on the plurality of the PDCCH candidates.

In one embodiment, the first state includes a TCI state of a plurality of PDCCH candidates being indicated by independent signalings, and presence of a PDCCH candidate with the TCI state unsuccessfully indicated. The receiving unit 101 is further configured to receive a DCI signaling on one or more PDCCH candidates with the TCI state successfully indicated.

In one embodiment, the first state includes presence of a PDCCH candidate corresponding to a TRP where beam failure occurs in a plurality of PDCCH candidates. The receiving unit 101 is further configured to receive a DCI signaling on one or more PDCCH candidates corresponding to a TRP in the TRPs without beam failure.

Figure 8:
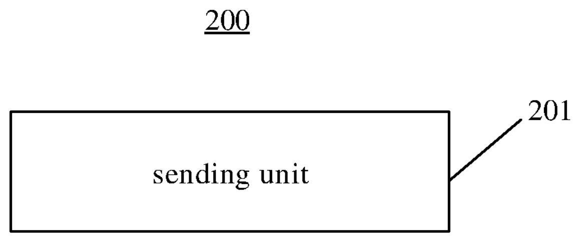
FIG. 8 is a block diagram illustrating a communication apparatus according to an embodiment of the present disclosure.

FIG. 8 is a block diagram of a communication apparatus according to an embodiment. Referring to FIG. 8, a communication apparatus 200 is performed by a network device, and includes a sending unit 201.

The sending unit 201 is configured to send indication information of a first decoding mode of DCI.

The DCI is DCI sent on one or more PDCCH candidates in one or more beam directions, and the first decoding mode is one or more of the plurality of different second decoding modes.

In one embodiment, the first decoding mode includes at least one of the following: performing independent decoding on the DCI sent on the one or more PDCCH candidates; and performing combined decoding on the DCI sent on the one or more PDCCH candidates.

In one embodiment, the sending unit 201 sends indication information of the first decoding mode of the DCI based on a first signaling.

In one embodiment, the first signaling is configured to indicate one or more of the plurality of different second decoding modes.

In one embodiment, one or more PDCCH candidates include a first number of PDCCH candidate combinations. The number of PDCCH candidates in each PDCCH candidate combination is greater than or equal to 1, and less than or equal to a total number of one or more PDCCH candidates. The second decoding modes include: performing combined decoding on the DCI received on the PDCCH candidates in each PDCCH candidate combination in the first number of PDCCH candidate combinations.

In one embodiment, the first signaling includes one or a combination of more of a RRC signaling, a MAC CE signaling, and a DCI signaling.

In one embodiment, the first signaling is configured to indicate a first time-frequency resource of a PDCCH candidate or a second time-frequency resource of a PDCCH candidate.

The first time-frequency resource of the PDCCH candidate is a time-frequency resource of a PDCCH candidate for a PDCCH transmission mode based on a plurality of TRPs, and the second time-frequency resource of the PDCCH candidate is a time-frequency resource of a PDCCH candidate for a PDCCH transmission mode based on a single TRP.

The first time-frequency resource of the PDCCH candidate and the second time-frequency resource of the PDCCH candidate correspond to different decoding modes.

In one embodiment, the first time-frequency resource of the PDCCH candidate corresponds to a combined decoding mode, and the second time-frequency resource of the PDCCH candidate corresponds to an individual decoding mode.

In one embodiment, the first decoding mode is determined based on a first state. The first state and a non-first state correspond to different decoding modes.

In one embodiment, the first state corresponds to an individual decoding mode, and the non-first state corresponds to a combined decoding mode.

In one embodiment, the first state corresponds to an individual decoding mode, and/or the second state corresponds to a combined decoding mode, which is determined based on a protocol.

In one embodiment, the first state includes one or a combination of the following.

A PDCCH candidate with a lower CSI feedback value is present in CSI feedbacks on a plurality of candidate physical downlink control channels. A DMRS with poor reception performance is present in DMRSs on a plurality of PDCCH candidates. A TCI state of a plurality of PDCCH candidates is indicated by independent signalings, and a PDCCH candidate with the TCI state unsuccessfully indicated is present. A PDCCH candidate corresponding to a TRP where beam failure occurs in a plurality of PDCCH candidates is present.

In one embodiment, in response to the first state of the terminal including presence of a DMRS with poor reception performance in DMRSs on a plurality of PDCCH candidates, the sending unit 201 is further configured to send a DCI signaling on one or more PDCCH candidates corresponding to the DMRS with the best reception performance in the DMRSs of the multiple PDCCH candidates.

In one embodiment, in response to the first state of the terminal including a TCI state of a plurality of PDCCH candidates being indicated by independent signalings, and presence of a PDCCH candidate with the TCI state unsuccessfully indicated, the sending unit 201 is further configured to send a DCI signaling on one or more PDCCH candidates with the TCI state successfully indicated.

In one embodiment, in response to the first state of the terminal including presence of a PDCCH candidate corresponding to a TRP where beam failure occurs in a plurality of PDCCH candidates, the sending unit 201 is further configured to send a DCI signaling on one or more PDCCH candidates corresponding to the TRPs without beam failure OMITS.

Regarding the apparatus in the above-mentioned embodiments, the implements in which each module executes operations has been described in detail in method embodiments, which will not be described in detail here.

Figure 9:
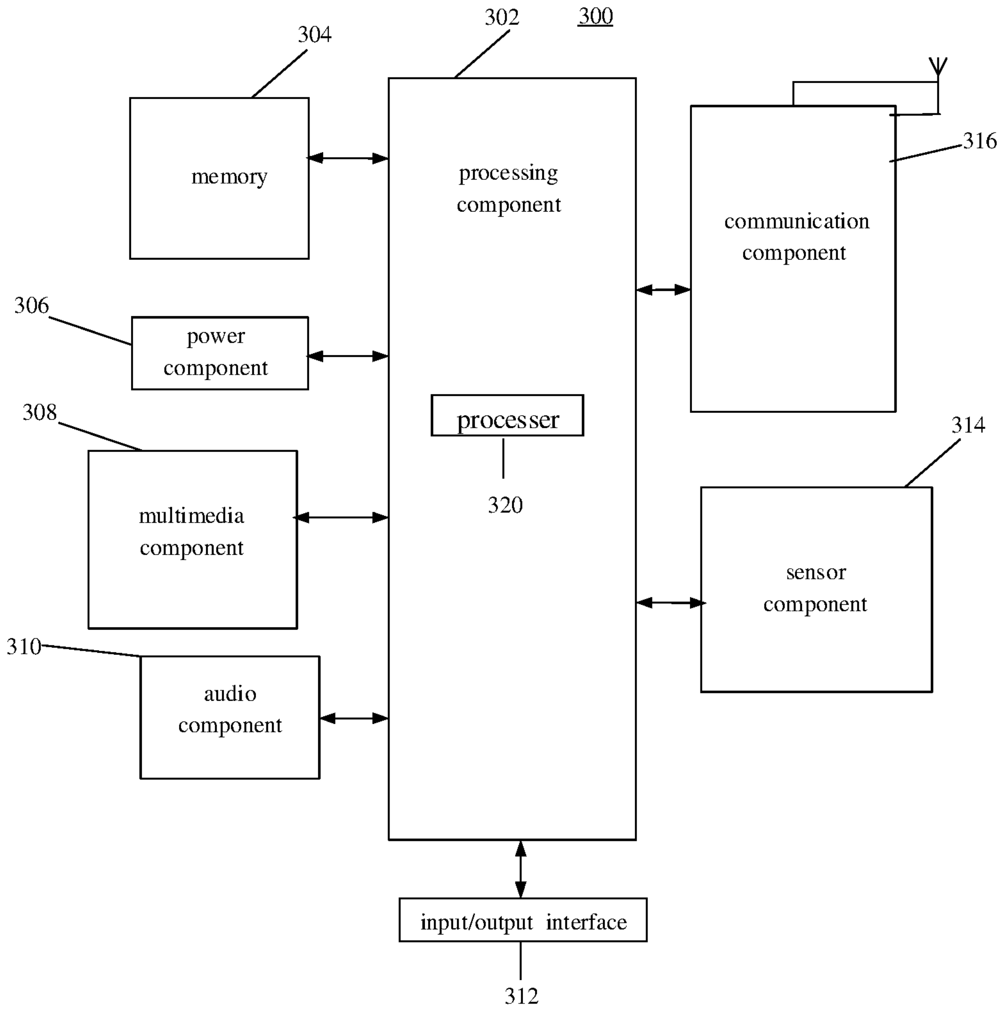
FIG. 9 is a block diagram illustrating a communication device according to an embodiment of the present disclosure.

FIG. 9 is a block diagram of a communication device 300 according to an embodiment. For example, the device 300 may be a mobile phone, a computer, a digital broadcast terminal, a messaging device, a game console, a tablet device, a medical device, a fitness device, a personal digital assistant, or the like.

As shown in FIG. 9, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or some of the steps of the above-mentioned method. Moreover, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, videos, etc. The memory 304 may be implemented using any type of volatile or non-volatile memory devices, or a combination thereof, such as a static random access memory (SRAM), an electrically erasable programmable read-only memory (EEPROM), an erasable programmable read only memory (EPROM), a programmable read only memory (PROM), a read-only memory (ROM), a magnetic memory, a flash memory, a magnetic or optical disk.

The power component 306 provides power to various components of the device 300. The power components 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense awake time and a pressure associated with the touch or swipe action. In some embodiments, the multimedia component 308 includes a front camera and/or a rear camera. The front camera and/or the rear camera may receive an external multimedia data while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone (MIC) configured to receive an external audio signal when the device 300 is in an operation mode, such as a call mode, a recording mode and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as keyboards, click wheels, buttons, and the like. The buttons may include, but are not limited to, a home button, a volume button, a starting button, and a locking button.

The sensor component 314 includes one or more sensors to provide status assessments of various aspects of the device 300. For example, the sensor component 314 may detect an open/closed status of the device 300, relative positioning of components, e.g., the display and the keypad, of the device 300, and a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor or a temperature sensor.

The communication component 316 is configured to facilitate communication, wired or wireless, between the device 300 and other devices. The device 300 may access a wireless network based on a communication standard, such as WiFi, 2G or 3G, or a combination thereof. In one illustrative embodiment, the communication component 316 receives a broadcast signal or broadcast associated information from an external broadcast management system via a broadcast channel In an illustrative embodiment, the communication component 316 further includes a near field communication (NFC) module to facilitate short-range communication. For example, the NFC module may be implemented based on a radio frequency identification (RFID) technology, an infrared data association (IrDA) technology, an ultra-wideband (UWB) technology, a bluetooth (BT) technology and other technologies.

In illustrative embodiments, the device 300 may be implemented with one or more application specific integrated circuits (ASICs), digital signal processors (DSPs), digital signal processing devices (DSPDs), programmable logic devices (PLDs), field programmable gate arrays (FPGA), controllers, micro-controllers, microprocessors, or other electronic components, for performing the methods described above.

In illustrative embodiments, there is also provided a non-transitory computer-readable storage medium including instructions, such as included in the memory 304, executable by the processor 320 in the device 300, for performing the above-mentioned method. For example, the non-transitory computer-readable storage medium may be a ROM, a RAM, a CD-ROM, a magnetic tape, a floppy disk, an optical data storage device, and the like.

Figure 10:
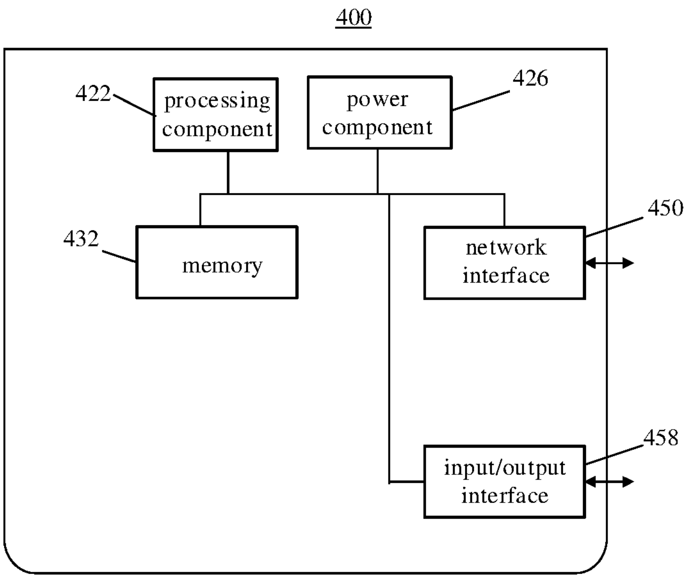
FIG. 10 is a block diagram illustrating a communication device according to an embodiment of the present disclosure.

FIG. 10 is a block diagram showing a communication device 400 according to an embodiment. For example, the device 400 may be provided as a network device. As shown in FIG. 10, the device 400 includes a processing component 422, which further includes one or more processors, and memory resources represented by a memory 432 for storing instructions executable by the processing component 422, such as application programs. The application program stored in the memory 432 may include one or more modules each corresponding to a set of instructions. In addition, the processing component 422 is configured to execute instructions to perform the above-mentioned method.

The device 400 may also include a power component 426 configured to perform power management of the device 400, a wired or wireless network interface 450 configured to connect the device 400 to a network, and an input-output (I/O) interface 458. The device 400 may operate based on an operating system stored in the memory 432, such as Windows Server™, Mac OS X™, Unix™, Linux™, FreeBSD™ or the like.

In one illustrative embodiment, there is also provided a non-transitory computer-readable storage medium including instructions, such as included in the memory 432, executable by the processing component 422 of the device 400, for performing the above-mentioned method. For example, the non-transitory computer-readable storage medium may be a ROM, a RAM, a CD-ROM, a magnetic tape, a floppy disk, an optical data storage device, and the like.

It is further understood that "plurality" in the present disclosure refers to two or more, and other quantifiers are similar thereto. The term "and/or" describes an association relationship of associated objects, indicating that there may be three types of relationships, for example, A and/or B may indicate: A exists independently, A and B exist simultaneously, and B exists independently. The character "I" generally indicates an "or" relationship between the contextual objects. The singular forms "a/an", "said" and "the" are also intended to include the plural unless the context clearly dictates otherwise.

It is further understood that the terms "first", "second", etc. are used to describe various information, but the information should not be limited to these terms. These terms are only used to distinguish information of the same type from one another, and do not imply a specific order or degree of importance. In fact, expressions such as "first" and "second" may be used interchangeably. For example, without departing from the scope of the present disclosure, first information may also be called second information, and similarly, the second information may also be called the first information.

It is further understood that although operations are described in a specific order in drawings in embodiments of the present disclosure, these operations should not be understood as be performed in the specific order shown or in a serial order, or that performing all operations shown to obtain a desired result. In certain circumstances, multitasking and parallel processing may be advantageous.

Other embodiments of the present disclosure will be apparent to those skilled in the art from consideration of the specification and practice of the disclosure disclosed here. The present disclosure is intended to cover any variations, uses, or adaptations of the disclosure following the general principles thereof and including such departures from the disclosure as come within known or customary practice in the art. It is intended that the specification and examples be considered as exemplary only, and the scope and spirit of the present disclosure are indicated by the attached claims.

It will be appreciated that the present disclosure is not limited to the exact construction that has been described above and illustrated in the accompanying drawings, and that various modifications and changes can be made without departing from the scope thereof. The scope of the present disclosure is limited only by the attached claims.

What is claimed is:

1. A communication method, performed by a terminal and comprising:

determining, based on a first signaling, a first decoding mode for downlink control information;

wherein the downlink control information is received on one or more candidate physical downlink control channels in one or more beam directions, wherein the first signaling is configured to indicate a first time-frequency resource of at least one candidate physical downlink control channel or a second time-frequency resource of at least one candidate physical downlink control channel, the first time-frequency resource is a time-frequency resource of a candidate physical downlink control channel for a transmission mode of a physical downlink control channel based on a plurality of transmission reception points (TRPs), and the second time-frequency resource is a time-frequency resource of a candidate physical downlink control channel for a transmission mode of a physical downlink control channel based on a single TRP, and the first time-frequency resource corresponds to a combined decoding mode or an individual decoding mode, and the second time-frequency resource corresponds to an individual decoding mode.

2. The communication method according to claim 1, wherein the first decoding mode is one or more of a plurality of different second decoding modes; and the first signaling is configured to indicate one or more of the plurality of different second decoding modes.

3. The communication method according to claim 2, wherein the one or more candidate physical downlink control channels comprise a first number of candidate physical downlink control channel combinations;

wherein a second number of candidate physical downlink control channels in each candidate physical downlink control channel combination is greater than or equal to 1, and less than or equal to a total number of the one or more candidate physical downlink control channels; and the second decoding modes comprise: performing combined decoding on the downlink control information received on the candidate physical downlink control channels in each candidate physical downlink control channel combination in the first number of the candidate physical downlink control channel combinations.

4. The communication method according to claim 1, wherein the first signaling comprises at least one of a radio resource control (RRC) signaling, a medium access control (MAC) control element (CE) signaling, or a downlink control information (DCI) signaling.

5. The communication method according to claim 1, wherein determining the first decoding mode for the downlink control information comprises:

determining the first decoding mode for the downlink control information based on a first state;

wherein the first state and a non-first state correspond to different decoding modes.

6. The communication method according to claim 5, wherein the first state corresponds to an individual decoding mode, and the non-first state corresponds to a combined decoding mode; or based on a protocol, it is determined that the first state corresponds to the individual decoding mode, and the non-first state corresponds to the combined decoding mode.

7. The communication method according to claim 1, wherein the first time-frequency resource and the second time-frequency resource correspond to different decoding modes.

8. The communication method according to claim 1, wherein the first decoding mode comprises at least one of:

performing individual decoding on the downlink control information received on the one or more candidate physical downlink control channels; or performing combined decoding on the downlink control information received on the one or more candidate physical downlink control channels.

9. A communication method, performed by a network device and comprising:

determining a first sending mode for downlink control information; wherein the downlink control information is sent on one or more candidate physical downlink control channels in one or more beam directions, and the first sending mode is sending the downlink control information on one or more physical downlink control channels, the first sending mode corresponds to a first decoding mode of a terminal; and sending indication information of the first decoding mode for the downlink control information based on a first signaling, wherein the first signaling is configured to indicate a first time-frequency resource of at least one candidate physical downlink control channel or a second time-frequency resource of at least one candidate physical downlink control channel, the first time-frequency resource is a time-frequency resource of a candidate physical downlink control channel for a transmission mode of a physical downlink control channel based on a plurality of transmission reception points (TRPs), and the second time-frequency resource is a time-frequency resource of a candidate physical downlink control channel for a transmission mode of a physical downlink control channel based on a single TRP, and the first time-frequency resource corresponds to a combined decoding mode or an individual decoding mode, and the second time-frequency resource corresponds to an individual decoding mode.

10. The communication method according to claim 9, wherein the first signaling is configured to indicate one or more of a plurality of different second decoding modes.

11. The communication method according to claim 10, wherein the one or more candidate physical downlink control channels comprise a first number of candidate physical downlink control channel combinations;

wherein a second number of candidate physical downlink control channels in each candidate physical downlink control channel combination is greater than or equal to 1, and less than or equal to a total number of the one or more candidate physical downlink control channels; and the second decoding modes comprise: performing combined decoding on the downlink control information sent on the candidate physical downlink control channels in each candidate physical downlink control channel combination in the first number of the candidate physical downlink control channel combinations.

12. The communication method according to claim 9, wherein the first signaling comprises at least one of a radio resource control (RRC) signaling, a medium access control (MAC) control element (CE) signaling, or a downlink control information (DCI) signaling.

13. A communication device, comprising:

a processor; and a memory for storing instructions executable by the processor;

wherein the processor is configured to implement the communication method according to claim 9.

14. The communication method according to claim 9, wherein the first time-frequency resource and the second time-frequency resource correspond to different decoding modes.

15. The communication method according to claim 9, wherein the first decoding mode comprises at least one of:

performing individual decoding on the downlink control information received on the one or more candidate physical downlink control channels; or performing combined decoding on the downlink control information received on the one or more candidate physical downlink control channels.

16. A communication device, comprising:

a processor; and a memory for storing instructions executable by the processor;

wherein the processor is configured to:

determine, based on a first signaling, a first decoding mode for downlink control information;

wherein the downlink control information is received on one or more candidate physical downlink control channels in one or more beam directions, wherein the first signaling is configured to indicate a first time-frequency resource of at least one candidate physical downlink control channel or a second time-frequency resource of at least one candidate physical downlink control channel, the first time-frequency resource is a time-frequency resource of a candidate physical downlink control channel for a transmission mode of a physical downlink control channel based on a plurality of transmission reception points (TRPs), and the second time-frequency resource is a time-frequency resource of a candidate physical downlink control channel for a transmission mode of a physical downlink control channel based on a single TRP, and the first time-frequency resource corresponds to a combined decoding mode or an individual decoding mode, and the second time-frequency resource corresponds to an individual decoding mode.

17. The communication device according to claim 16, wherein the first decoding mode comprises at least one of:

performing individual decoding on the downlink control information received on the one or more candidate physical downlink control channels; or performing combined decoding on the downlink control information received on the one or more candidate physical downlink control channels.

* * * * *